(12) United States Patent
Baldwin et al.

(10) Patent No.: US 12,433,492 B2
(45) Date of Patent: Oct. 7, 2025

(54) BLEEDING SENSOR FOR A PATIENTS GASTROINTESTINAL TRACT

(71) Applicant: NICHE BIOMEDICAL, INC., Los Angeles, CA (US)

(72) Inventors: Alexander Barnes Baldwin, Santa Monica, CA (US); Yi-Kai Lo, Culver City, CA (US)

(73) Assignee: NICHE BIOMEDICAL, INC., Los Angeles, CA (US)

( * ) Notice: Subject to any disclaimer, the term of this patent is extended or adjusted under 35 U.S.C. 154(b) by 0 days.

(21) Appl. No.: 18/554,527

(22) PCT Filed: Apr. 6, 2022

(86) PCT No.: PCT/US2022/023579
§ 371 (c)(1),
(2) Date: Oct. 9, 2023

(87) PCT Pub. No.: WO2022/221104
PCT Pub. Date: Oct. 20, 2022

(65) Prior Publication Data
US 2024/0081654 A1    Mar. 14, 2024

Related U.S. Application Data

(60) Provisional application No. 63/173,561, filed on Apr. 12, 2021.

(51) Int. Cl.
*A61B 5/02* (2006.01)
*A61B 5/00* (2006.01)

(52) U.S. Cl.
CPC ........ *A61B 5/02042* (2013.01); *A61B 5/0086* (2013.01); *A61B 5/4222* (2013.01); *A61B 5/6861* (2013.01); *A61B 5/7225* (2013.01)

(58) Field of Classification Search
None
See application file for complete search history.

(56) References Cited

U.S. PATENT DOCUMENTS 4,803,992 A * 2/1989 Lemelson ............ A61B 5/4839
600/561
5,073,500 A * 12/1991 Saito ........................ A61B 5/20
4/300

(Continued)

FOREIGN PATENT DOCUMENTS

EP          2057934 A1    5/2009
JP          2014514039 A  6/2014
WO          20200212538 A1 10/2022

OTHER PUBLICATIONS

PCT International Search Report and Written Opinion for corresponding International Application Serial No. PCTUS2022/023579, mailed Jul. 19, 2022, pp. 1-9.

(Continued)

*Primary Examiner* — Jacqueline Cheng
*Assistant Examiner* — Jairo H Portillo
(74) *Attorney, Agent, or Firm* — Tarolli, Sundheim, Covell &Tummino LLP

(57) ABSTRACT

Systems and methods that can employ a bleeding sensor that uses an optical mechanism to detect blood in the patients GI tract are described. The bleeding sensor includes a substrate holding a centrally-located light detector with a broad sensitivity spectrum and at least two light emitters positioned radially around the centrally-located light detector, each light emitter configured to emit light of different primary wavelengths. The bleeding sensor has a gap between each of the at least two light emitters and the centrally-located light detector that accepts the contents of a patients gastrointestinal tract. An optical cap covers the centrally-located light detector and the at least two light emitters to direct the light (Continued)

emitted from the at least two light emitters through the gap and onto the centrally-located light detector.

20 Claims, 10 Drawing Sheets

(56) References Cited

U.S. PATENT DOCUMENTS

| | | | |
|---|---|---|---|
| 2003/0023150 A1* | 1/2003 | Yokoi | A61B 1/00158 |
| | | | 348/E5.026 |
| 2004/0225189 A1 | 11/2004 | Kimoto et al. | |
| 2005/0288555 A1* | 12/2005 | Binmoeller | A61B 5/6882 |
| | | | 600/300 |
| 2006/0004255 A1 | 1/2006 | Iddan | |
| 2009/0124853 A1* | 5/2009 | Gono | A61B 1/042 |
| | | | 73/1.01 |
| 2009/0312631 A1* | 12/2009 | Rabinovitz | A61B 5/0071 |
| | | | 600/431 |
| 2011/0306855 A1 | 12/2011 | Rabinovitz et al. | |
| 2013/0231536 A1 | 9/2013 | Pascal | |
| 2014/0275860 A1 | 9/2014 | Rottenberg et al. | |
| 2014/0296666 A1* | 10/2014 | Rabinovitz | A61B 1/063 |
| | | | 600/310 |
| 2018/0168490 A1* | 6/2018 | Jones | A61B 5/7282 |
| 2020/0229687 A1 | 7/2020 | Schurr et al. | |
| 2020/0367818 A1* | 11/2020 | DaCosta | A61B 5/4887 |
| 2020/0367828 A1 | 11/2020 | Sun et al. | |
| 2022/0183629 A1* | 6/2022 | Dicarlo | A61B 5/0071 |

OTHER PUBLICATIONS

European Patent Office search report dated Jun. 26, 2024 for corresponding application No. /patent No. 22788664.5-1113 / 4322853 PCT/US2022023579, applicant Niche Biomedical, Inc., 10 pages.
Office Action issued for Israel Patent Application 307631, dated Dec. 24, 2024, 5 pages.

* cited by examiner

BLEEDING SENSOR FOR A PATIENTS GASTROINTESTINAL TRACT

CROSS-REFERENCE TO RELATED APPLICATIONS

This application claims the benefit of U.S. Provisional Patent Application No. 63/173,561, filed Apr. 12, 2021, entitled BLEEDING SENSOR FOR GI TRACT. The subject matter of these applications is incorporated herein by reference in their entirety.

GOVERNMENT SUPPORT

This invention was made with government support under 1938625 awarded by National Science Foundation Small Business Innovations Research Phase I The government has certain rights in the invention.

TECHNICAL FIELD

This disclosure relates generally to detecting blood in a patient's gastrointestinal (GI) tract and, more specifically, to systems and methods that can employ a bleeding sensor that uses an optical mechanism to detect blood in the patient's GI tract.

BACKGROUND

Gastrointestinal (GI) bleeding, also known as GI hemorrhage, may occur at any site within the GI tract, from the mouth to the rectum. GI bleeding may be caused by a variety of different disorders including peptic ulcers, esophageal varices, cancer, hemorrhoids, inflammatory bowel diseases, fistula, liver cirrhosis, *H pylori* infection, polyps, esophagitis, or others. Small amounts of GI bleeding may cause anemia, chest pain, abdominal pain, shortness of breath, or fainting; larger GI bleeds are more dangerous, with a risk of death between 5% and 30%. Currently, GI bleeding is diagnosed through fecal occult blood testing or endoscopy/colonoscopy. Locating the source of bleeding is critical for proper treatment to reduce mortality and morbidity.

GI hemorrhage can also occur as a complication of abdominal surgeries; in this case, GI hemorrhage has high mortality rates if not treated in a timely manner. Timely diagnosis of postsurgical hemorrhage is critical, as proactive treatment can reduce bleeding, prevent the need for additional surgical procedures, and reduce patient mortality. Current methods of diagnosing hemorrhage after surgery, such as computed tomography with contrast or endoscopy, pose additional risks to a patient already in a state of recovery. Optical detection of blood may be feasible for rapid GI hemorrhage detection, but interference from fecal matter has prevented practical implementation, especially in the colon.

SUMMARY

Described herein is a sensor that can perform optical detection of blood in a patient's GI tract while eliminating interference from fecal matter and/or other elements. The sensor can detect the blood by emitting light of different primary wavelengths through contents of the patient's GI tract and reducing the interference after the light signals of different primary wavelengths are detected after traversing the contents of the patient's GI tract.

In one aspect, the present disclosure includes a sensor that detects blood in the contents of a patient's gastrointestinal tract based on detected light signals. The sensor can include a substrate, a centrally-located light detector with a broad sensitivity spectrum on the substrate, and at least two light emitters on the substrate. The at least two light emitters are each configured to emit light of different primary wavelengths and are each located radially around the centrally-located light detector. The sensor also includes a gap between each of the at least two light emitters and the centrally located light detector and configured to accept contents of a patient's gastrointestinal tract and an optical cap placed on top of the centrally-located light detector and the at least two light emitters and configured to direct light emitted by the at least two light emitters, through the gap, and onto the centrally-located light detector. The blood is detectable in the contents of the patient's gastrointestinal tract based on light signals detected by the centrally-located light detector after passing through contents of the patient's gastrointestinal tract in the gap.

In another aspect, the present disclosure includes a method for detecting blood in the contents of the patient's gastrointestinal tract based on detected light signals, with the following steps. Placing a sensor inside a gastrointestinal tract of a patient. The sensor including: a centrally-located light detector with a broad sensitivity spectrum on a substrate; at least two light emitters, each configured to emit light of different primary wavelengths, each located radially around the centrally-located light detector on the substrate; a gap between the at least two light emitters and the light detector configured to accept contents of a patient's gastrointestinal tract; and an optical cap configured to direct light emitted by the at least two light emitters through the gap and onto the centrally-located light detector, wherein the optical cap is positioned on top of the centrally-located light detector, the gap, and the at least two light emitters. Emitting, by the at least two light emitters, the light of the different primary wavelengths through the contents of the patient's gastrointestinal tract in the gap to the centrally-located light detector. And, detecting, by the centrally-located light detector, the light of the different primary wavelengths emitted from the at least two light emitters through the contents of the patient's gastrointestinal tract in the gap. The blood is detectable in the contents of the patient's gastrointestinal tract based on light signals detected by the centrally-located light detector after passing through contents of the patient's gastrointestinal tract in the gap.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

I. Definitions

Figure 1:
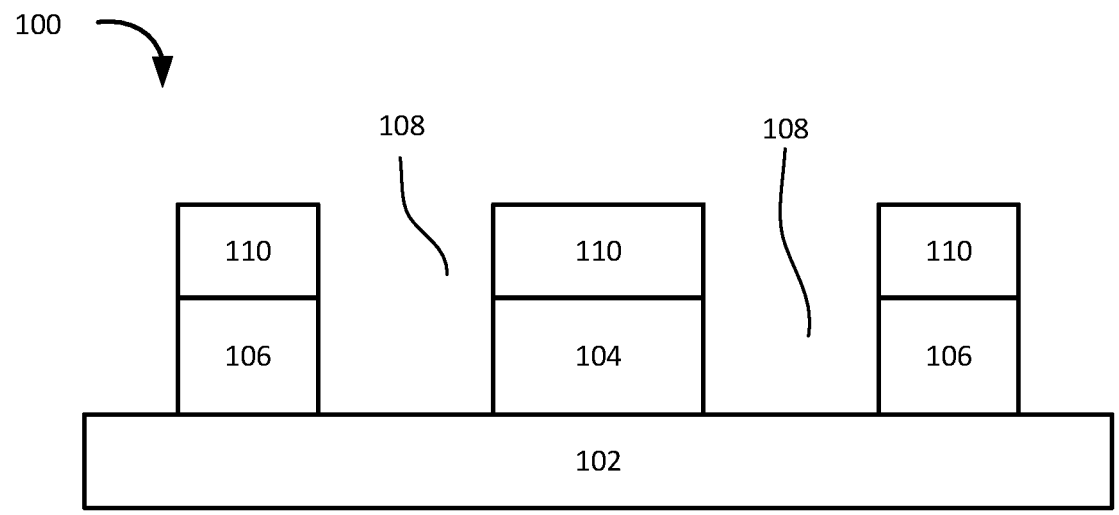
FIG. 1 is a side view of a block diagram of an example optical sensor that can detect blood in contents of at least a portion of a patient's gastrointestinal ("GI") tract.

In the context of the present disclosure, the singular forms "a," "an" and "the" can also include the plural forms, unless the context clearly indicates otherwise.

The terms "comprises" and/or "comprising," as used herein, can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items. Use of the terms "and" and "or" alone should be read as "and/or" unless specifically mentioned that such an interpretation is not intended.

Additionally, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

When a feature or element is referred to as being "on" another feature or element, the feature or element can be directly on the other feature or element or intervening features and/or elements may also be present. However, when a feature or element is referred to as being "directly" on another feature or element, there are no intervening features or elements present. It will also be understood that, when a feature or element is referred to as being "connected", "attached" or "coupled" to another feature or element, it can be directly connected, attached, or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

As used herein, and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under", or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

As used herein, the term "subject" can refer to any warm-blooded organism including, but not limited to, a human being, a pig, a rat, a mouse, a dog, a cat, a goat, a sheep, a horse, a monkey, an ape, a rabbit, a cow, etc. The terms "patient" and "subject" can be used interchangeably herein.

As used herein, the term "gastrointestinal", also referred to as "GI", can refer to one or more body parts (or organs) that food and liquids travel through when they are swallowed, digested, absorbed, and exit a subject's body as fecal matter. In other words, the term GI may refer to any site or sites within the GI tract, from the mouth to the rectum (including, but not limited to, the esophagus, stomach, intestines, colon, rectum, etc.), and the terms "GI" and "GI tract" may be used interchangeably.

As used herein, the terms "GI bleeding" and "GI hemorrhage" can refer to any type of bleeding that starts in the GI tract. Such bleeding can be a symptom of a disease or disorder in a subject's GI tract. It should be noted that the terms GI bleeding and GI hemorrhage can refer to any level of bleeding, from mild to severe.

II. Overview

The present disclosure relates generally to a "bleeding sensor" for optical detection of gastrointestinal (GI) bleeding. The bleeding sensor can detect and quantify blood inside the GI tract, while removing issues related to interference from fecal matter (and other obstacles). In other words, the bleeding sensor can enable practical and rapid GI hemorrhage detection through an optical means by using at least two separate primary light wavelengths, a gap, and a central detector.

The bleeding sensor can be used to assist a doctor in early detection of post-surgical hemorrhage, a serious and often deadly complication following GI surgery. The bleeding sensor can also be used for the easy detection and location of bleeding in the GI tract of a patient with either a high risk of GI bleeding or a suspected GI bleed. The bleeding sensor can be placed inside the GI tract during a surgical procedure or can be swallowed by a patient (prior to or after) a surgical procedure. As an example, the bleeding sensor can be part of a pill-like device, a capsule-like device, a probe-like device, or the like. The bleeding sensor may alert, for example through a wireless communication, a physician or other user to the presence, quantity, location, or other characteristic (e.g., fresh vs. occult) of blood. For example, the bleeding sensor can interact with software to provide a diagnosis and/or a suspected location of hemorrhage; this location may be determined through characteristics of the detected blood (e.g, fresh vs occult) in relation to the known location of the sensor. In some embodiments, the bleeding sensor may be combined with a number of other sensors (pH, temperature, pressure, movement, impedance, etc.) or therapeutic modalities (neuromodulation, photobiomodulation, drug release, etc.) in the same device.

III. Systems

One aspect of the present disclosure can include a system that can employ a bleeding sensor that uses an optical mechanism to detect blood in the patient's gastrointestinal (GI) tract and a device communicating with the bleeding sensor to detect/diagnose GI bleeding. The bleeding sensor can detect, for example, a concentration of blood and/or a property of blood, which can allow for differentiation between fresh blood and occult blood and/or for differentiation between blood and other matter (e.g., fecal matter). The bleeding sensor can communicate with the device, which can determine a diagnosis and whether to alert the physician associated with the patient and/or the patient.

An example of the bleeding sensor 100 is shown in the block diagram of FIG. 1. In its most basic form, the bleeding sensor 100 can enable practical and rapid GI hemorrhage detection through an optical means by using at least two light emitters 106 that can emit separate primary light wavelengths, a gap 108 (at least partially open to surrounding contents) configured to accept contents of a patient's GI tract therein, and a centrally-located light detector 104. It should be understood that the light emitters 106 may be referred to as LEDs and the centrally-located light detector 104 may be referred to as a photodetector, but these are not exclusive examples. At least a portion of the bleeding sensor can be covered by an optical cap 110 configured to direct light emitted by the at least two light emitters 106, through the gap 108, and onto the centrally-located light detector 104. The bleeding sensor 100 can detect blood in the contacts of the patient's gastrointestinal tract based on light signals detected by the centrally-located light detector 104 after the light signals have passed through the contents of the patient's GI tract in the gap 108.

As shown, the bleeding sensor 100 includes a centrally-located light detector 104 and two (or more) light emitters 106 that are embodied on a substrate 102. The two or more light emitters 106 are located radially around the centrally-located light detector 104, and a gap 108 exists between the two or more light emitters 106 and the centrally-located light detector 104 for contents of the GI tract to enter. It should be noted that each of the two or more light emitters 106 can be configured to emit light at a different primary light wavelength (e.g., each light emitter emitting light of ultraviolet, blue, green, red, and/or infrared (IR) wavelengths), while the centrally-located light detector 104 can have a broad sensitivity spectrum that enables detection and measurement of incident light across a wide range of wavelengths. The primary wavelengths may be separated, such as falling within a different range of wavelengths (e.g., each being one of ultraviolet, blue, green, red, or IR). As an example, the centrally-located light detector 104 can be a photodiode, while the two or more light emitters 106 can be light emitting diodes (LEDs). Because the gap 108 is at least partially open, gastrointestinal (GI) fluid can enter and leave the gap 108.

One example setup of the bleeding sensor 100 includes a central photodiode as centrally-located detector 104 and a plurality of LEDs (at least two LEDs) radially surrounding the central photodiode as light emitters 106 are embodied on a substrate 102, which may be a printed circuit board (PCB) in this example. A gap 108 is formed in the area between the plurality of LEDs and the central photodiode for GI contents to flow through. The gap 108 may be a ring or any shape and may or may not be continuous all the way around the central photodiode 104.

In one example, four LEDs can be used, one of each of the LEDs emitting light at blue (465 nm), green (525 nm), red (660 nm), and IR (940 nm) wavelengths. The purpose behind using multiple LEDs at different wavelengths is two-fold. First, oxygenated and deoxygenated blood absorb light differently at different wavelengths, so by measuring at multiple wavelengths a ratio of oxygenated to deoxygenated blood can be produced and the relative distance between the sensor and the hemorrhage can be inferred (e.g., with fresh blood, the bleeding can be inferred to be near the sensor, but occult blood can be inferred to be a distance away from the sensor). Second, the intestines and especially the colon contain debris and fecal matter that could cause a false signal if only a single frequency/wavelength was used, but this material absorbs light differently than blood, so by using a range of wavelengths the errant signal from these debris and fecal matter can be filtered out.

Each LED can be connected to an LED driver circuit; this may consist of a LED driver integrated circuit (IC), a custom IC/SoC that produces precise current outputs, or an analog circuit for current regulation. Power to each LED may be controlled by a microcontroller unit (MCU)/FPGA/DSP (not shown) that allows sequential activation of each LED 206 with precise timing and allows fine tuning of the LEDs output power as part of a feedback loop with the photodiode 204 so that maximum sensitivity is achieved with minimum power draw. The photodiode 204 may be connected to a single or multi-stage analog front-end circuit with variable gain (e.g., an amplifier circuit); this gain may also be adjusted dynamically by the MCU/FPGA/DSP as part of a feedback system.

Figure 2:
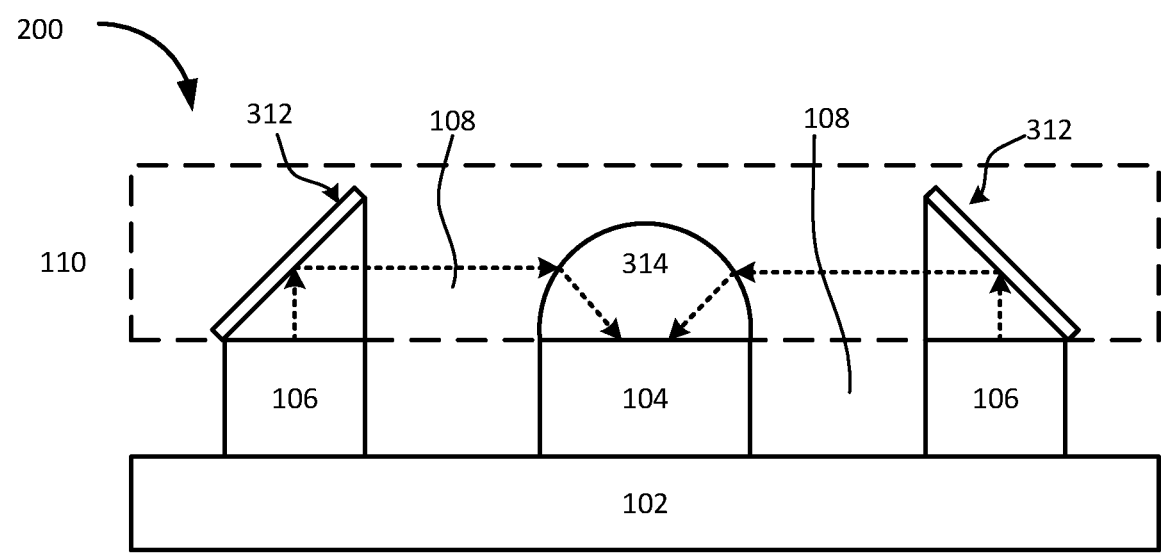
FIG. 2 is a side view of a block diagram of another example optical sensor.

FIG. 2 shows an example bleeding sensor 200 (an example of optical sensor 100). The example optical sensor 200 includes a centrally-located light detector 104 and two (or more) light emitters 106 that are embodied on a substrate 102. The two or more light emitters 106 are located radially around the centrally-located light detector 104, and a gap 108 exists between the two or more light emitters 106 and the centrally-located light detector 104 for contents of the GI tract to enter. The optical cap 110, can include one or more lenses 314 (such as a wide-angle lens) and/or mirror structures 312 that may be placed above/on top of the light emitters 106 and the centrally-located light detector 104. In one form, the bleeding sensor 200 may also include an opaque spacer placed between the light emitters 106 and the centrally-located light detector 104 to prevent light from traveling sideways between them, ensuring that all light hitting the centrally-located light detector 104 passed through the GI tract fluid in the gap 108 before reaching the centrally-located light detector 104. This structure may require the light emitters 106 to be high-powered LEDs and the centrally-located light detector 104 to be a highly sensitive photodiode to operate due to the low amount of light transmission that will occur since there is no direct optical path (so all light paths between the light emitters 106 and the centrally-located light detector 104 depend either on scattering in the GI fluid or reflection off the GI tract sidewalls).

For example, the optical cap can include at least two mirrors 312 positioned above each of the at least two light emitters 106 (one mirror 312 per one light emitter 106) and a wide-angle lens 314 positioned above the central detector 104. The at least two mirrors 312 can be configured to direct the light emitted by each of the at least two light emitters 106 through the gap 308 (which may include the GI tract contents) and onto the wide-angle lens 314, which can direct the light to the centrally-located light detector 104.

This optical cap 110, including mirrors 312 and lens 314 structure (e.g., a wide-angle lens), may include a mirror 312 placed at an angle above each light emitter 106 to direct light horizontally so that the light passes through gap 108, which may contain GI fluid, and onto a central wide-angle lens 314, which can direct light from any direction onto the centrally-located light detector 104. Using such an optical cap 110 structure means the centrally-located light detector 104 can measure the optical transmission through the GI tract contents of the wavelengths emitted from the at least two light emitters 106. In one example, a mirror 312 can be placed at an angle of around 45 degrees relative to one LED 306; in another embodiment, the mirror could be curved (concave or convex) to provide a more focused reflection. Some embodiments may also include collimators or lenses placed above the LEDs 306. The mirror(s) 312 could either be continuous around the radius of the sensor, or gaps could be placed in it between locations of the two or more light emitters 106 to allow easier ingress and egress of GI tract fluid.

Figure 3:
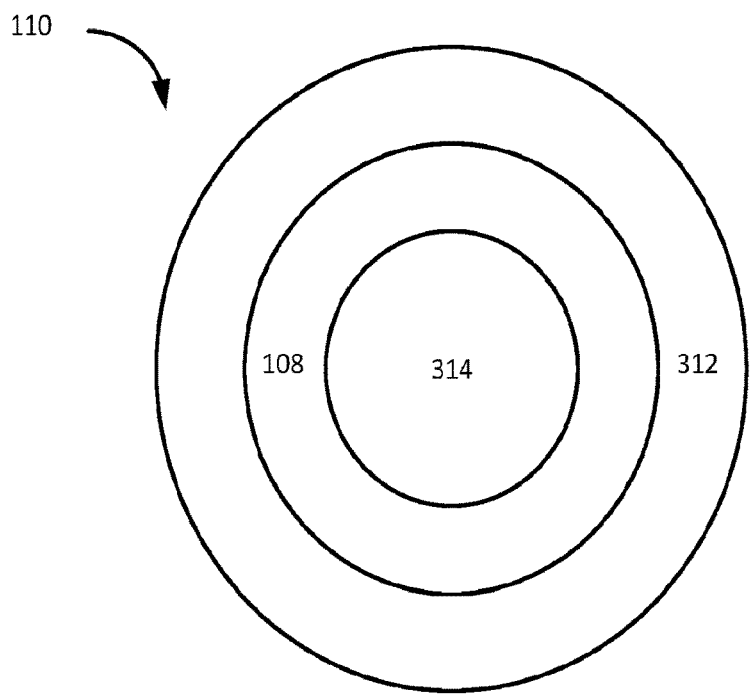
FIG. 3 is a top view of an example block diagram of an optical cap that can be used in FIG. 2.
Figure 4:
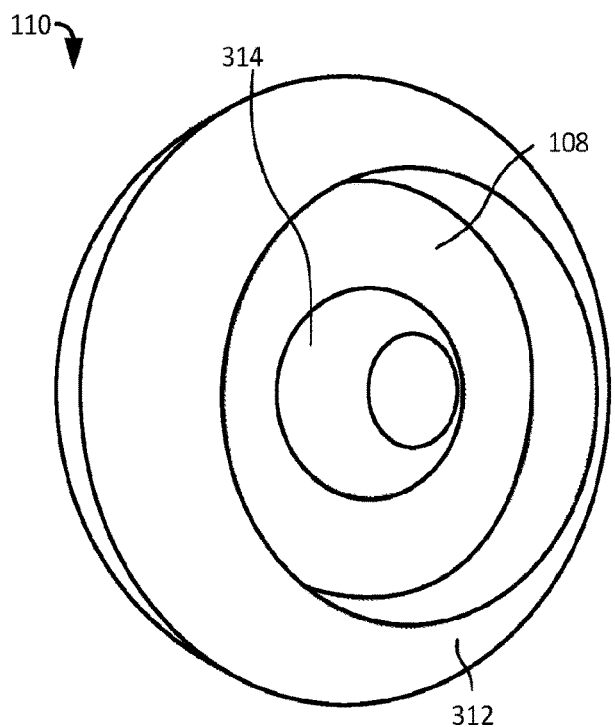
FIG. 4 is a perspective view of the optical cap of FIG. 3.
Figure 6:
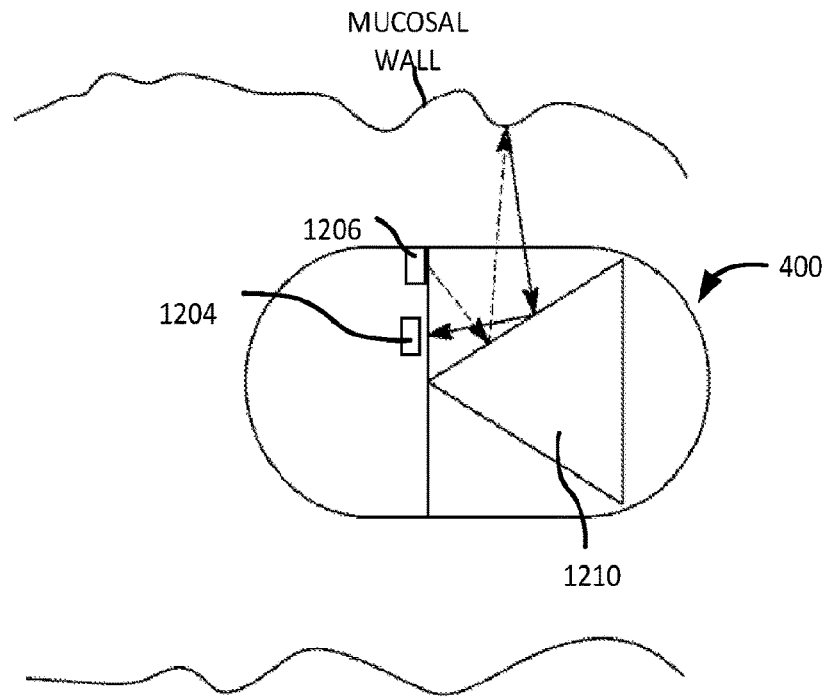

Examples of the optical cap 110 are shown in FIGS. 3-4. FIG. 3 shows a top view of the optical cap 110 of the bleeding sensor, showing the mirror(s) 312, the lens structure 314, and the fluid-filled gap 108 therebetween. FIG. 6 shows a three-dimensional perspective view of the optical cap 110. The open design of the fluid-filled gap 108 in the bleeding sensor ensures that fresh GI fluid is continuously introduced to the sensor. In another example, to further increase movement/turnover of GI fluid within the fluid-filled gap 108, various electromechanical elements may be included in certain embodiments of the bleeding sensor. As an example, the bleeding sensor may include an electromechanical device which induces vibration, which may be activated either constantly or intermittently and can be used to 1) accelerate the movement of fluid through the fluid-filled gap in the bleeding sensor and/or 2) remove debris and/or fecal matter that is stuck inside the fluid-filled gap. In some embodiments, the vibration may be activated or deactivated in a closed-loop method based on measurements from an optical sensor positioned within the fluid-filled gap. Other examples of the bleeding sensor may include different structures for accelerating fluid movement and/or removing debris. For example, the fluid-filled gap may include one or more electrode structures that can apply a voltage or current that may be used to produce microbubbles via electrolysis, and those bubbles can push debris out of the fluid-filled gap 108 before dissolving back into the surrounding GI fluid. Another example may have one or more portions of the bleeding sensor spin or rotate to force fresh GI fluid into the fluid-filled gap 108.

Figure 5:
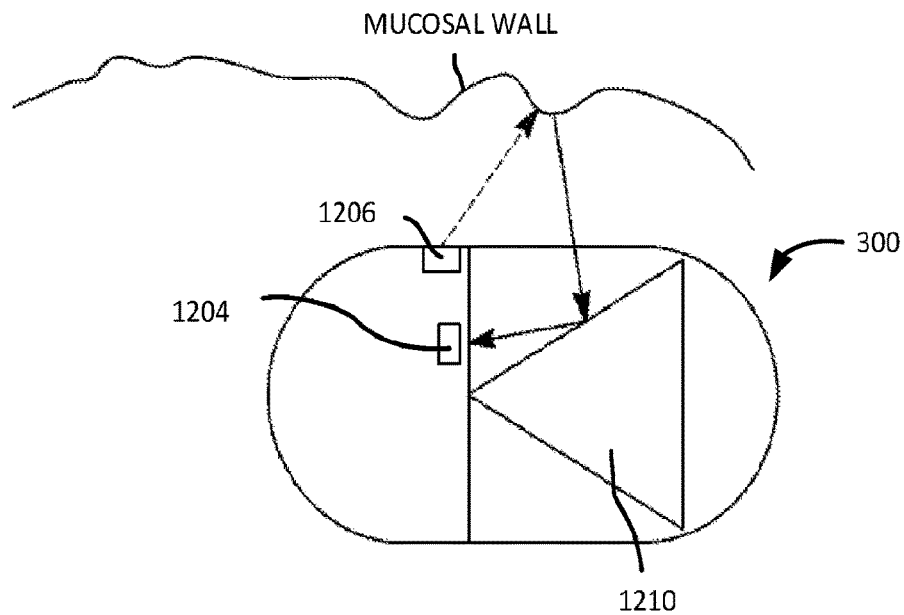
FIGS. 5 and 6 are schematic drawings of another embodiment of the sensor that can direct light sideways at a mucosal wall of the GI tract.

FIGS. 5 and 6 show alternative embodiments of the optical sensor 300, 400. Both alternative embodiments can include one or more light emitters (or photodiodes, LEDs, etc.) corresponding to one or more photodetectors (e.g., one large photodiode, photodiodes on different sides of a cone shaped or pyramidal mirror, etc.). In each of FIGS. 5 and 6, the optical sensor 300 and 400 a cone-shaped or pyramidal mirror 1210 and a lens structure can be placed over the photodetector 1204/light source 1206. Using this structure, the light source 1206 can shine light towards the mirror 1210 and the mirror can direct the light towards the sidewalls of the GI tract. The side walls of the GI tract can reflect a portion of the light back towards the mirror 1210 and the mirror can direct the reflected light onto the detector 1204. Alongside measuring blood properties in GI fluid through scattering and/or transmission measurements, this bleeding sensor structure can measure optical properties of the GI tract sidewalls based on the reflected light, such as tissue oxygenation (StO2) of the GI tract or movement of the GI tract. As an example, multiple LEDs that emit different wavelengths (and therefore have different penetration depths, described above) mean the bleeding sensor can make multiple measurements at the same time. For example, shorter wavelengths of light can be used to measure blood in the surrounding GI fluid, medium wavelengths can be used to measure movement of the GI tract wall, and longer wavelengths can be used to measure tissue oxygenation via blood vessels inside the GI tract mucosal wall. In one embodiment, a hybrid optical structure may direct light from some LEDs outward towards the mucosal wall and direct light from other LEDs inward, through a fluid-filled gap.

Figure 7:
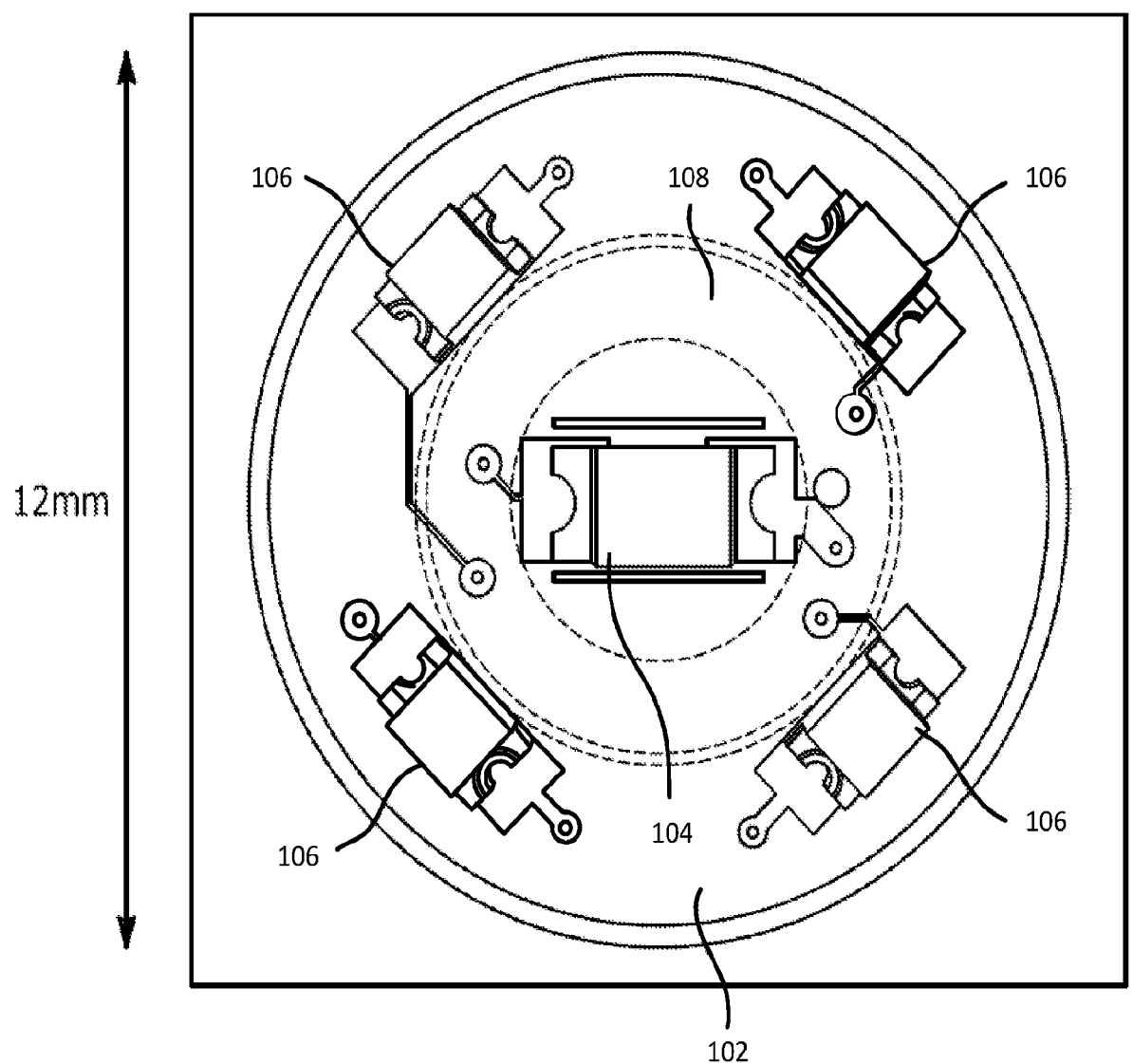
FIG. 7 is an example of an optical sensor that was used in an experimental setting.
Figure 8:
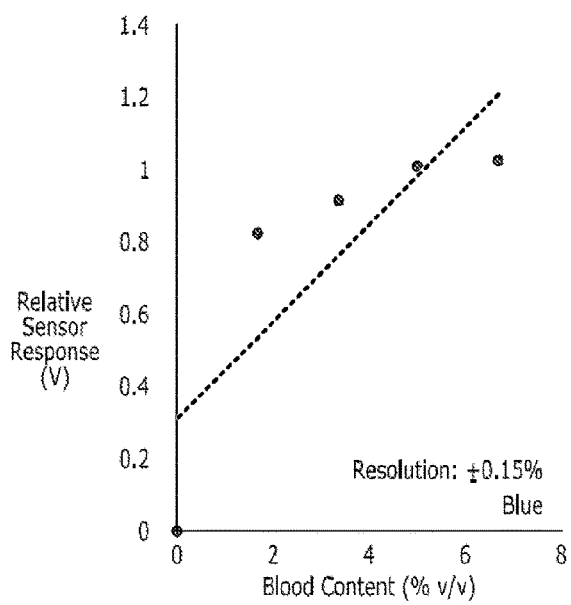
FIGS. 8-11 are plots of the response of an embodiment of the sensor at different wavelengths to the addition of blood to a saline solution containing 20% solid porcine fecal matter.
Figure 9:
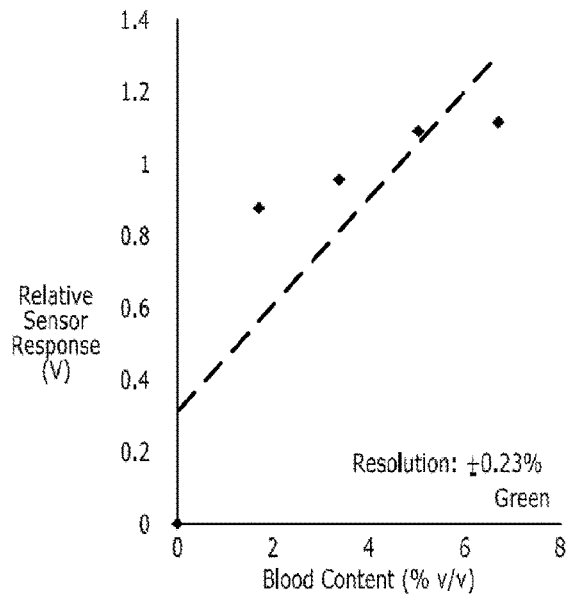
Figure 10:
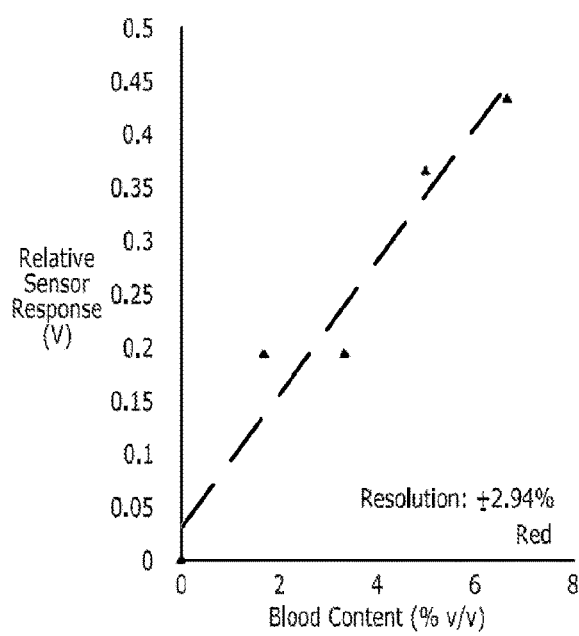
Figure 11:
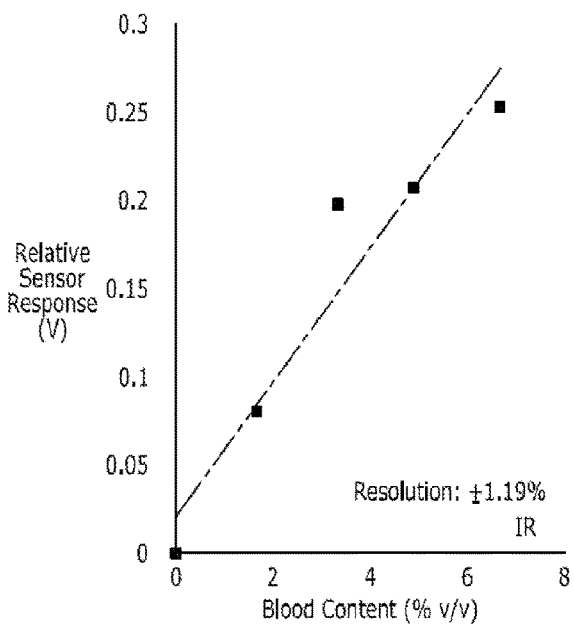
Figure 12:
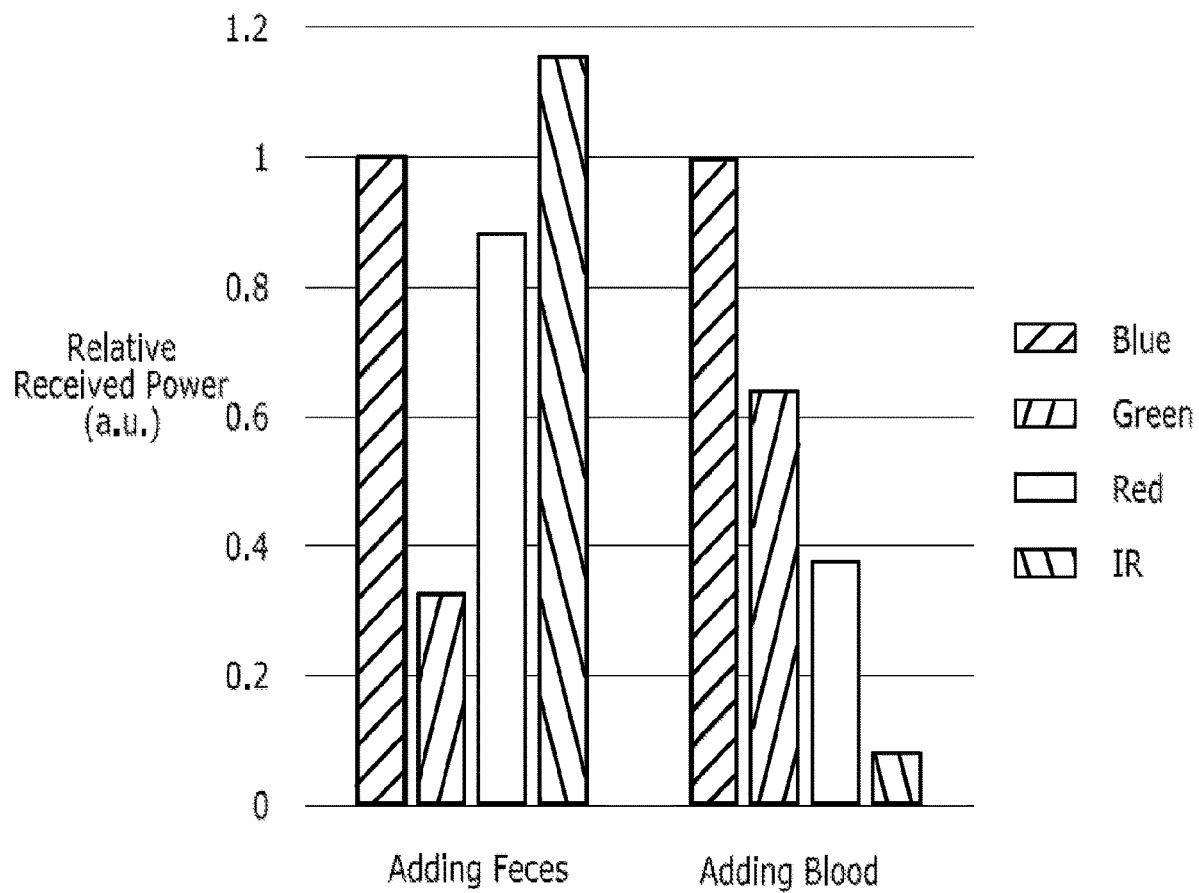
FIG. 12 shows a plot of the relative change in sensor response to different lights when adding fecal matter to saline and when adding blood to saline and fecal matter.

Validation of some embodiments of the bleeding sensor have been performed on the benchtop using physiological saline in combination with different concentrations of porcine blood and fecal matter. For one test, four LEDs and a photodiode were placed on two different PCBs facing each other across a 12 mm gap (shown in FIG. 7). Blood was gradually introduced to a mixture of physiological saline and fecal matter while the photodiode measured transmission from the four LEDs, each at a different wavelength. The bleeding sensor can detect blood concentration accurately, with different sensitivities at different wavelengths. Also, different wavelengths responded differently to the addition of blood to saline versus the addition of colonic fecal matter, supporting the use of multispectral transmission for distinguishing blood from debris. FIGS. 8-12 show the relative sensor response corresponding to blood content.

Figure 13:
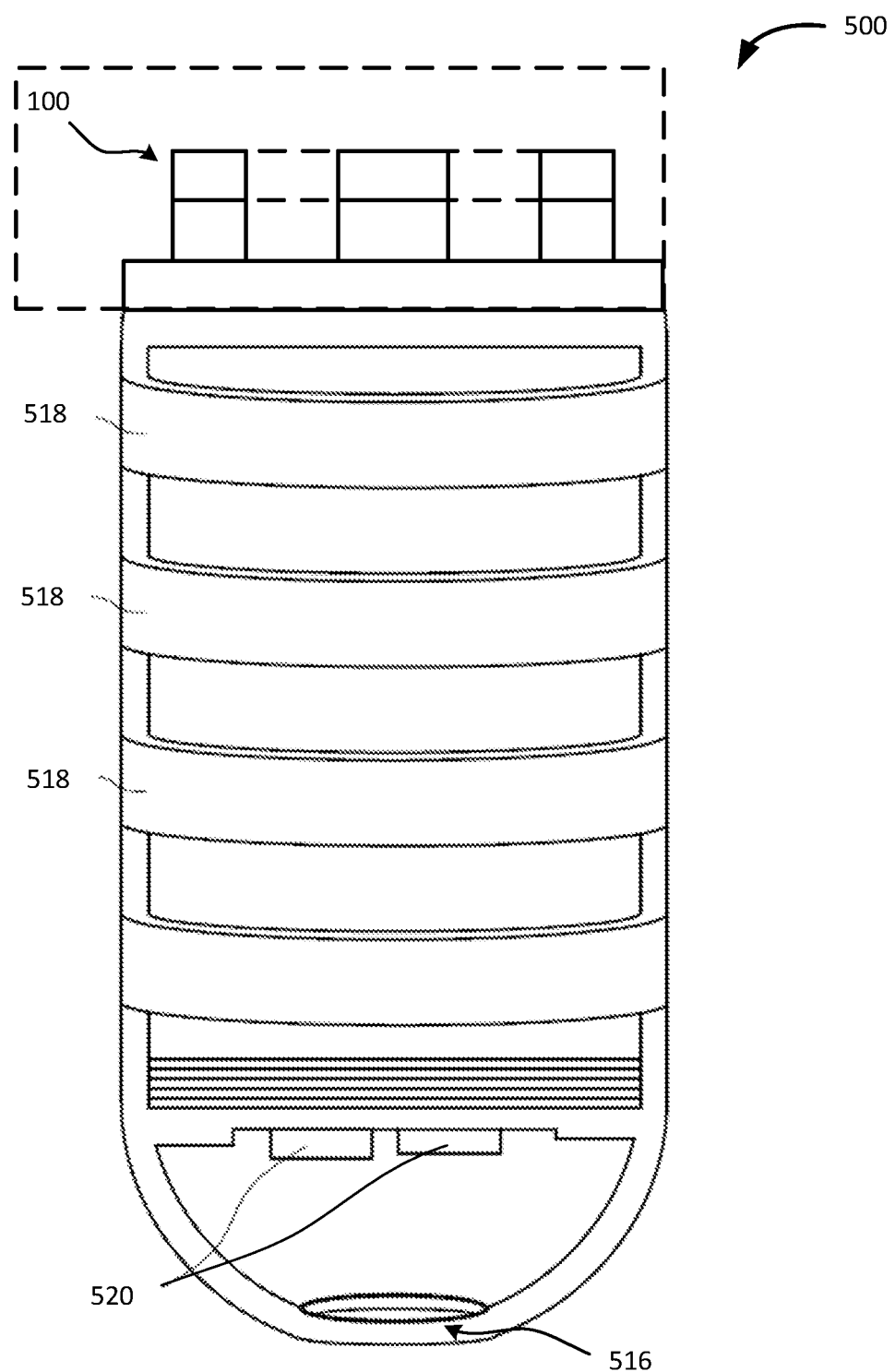
FIG. 13 is an example of a pill shaped capsule including the optical sensor.
Figure 14:
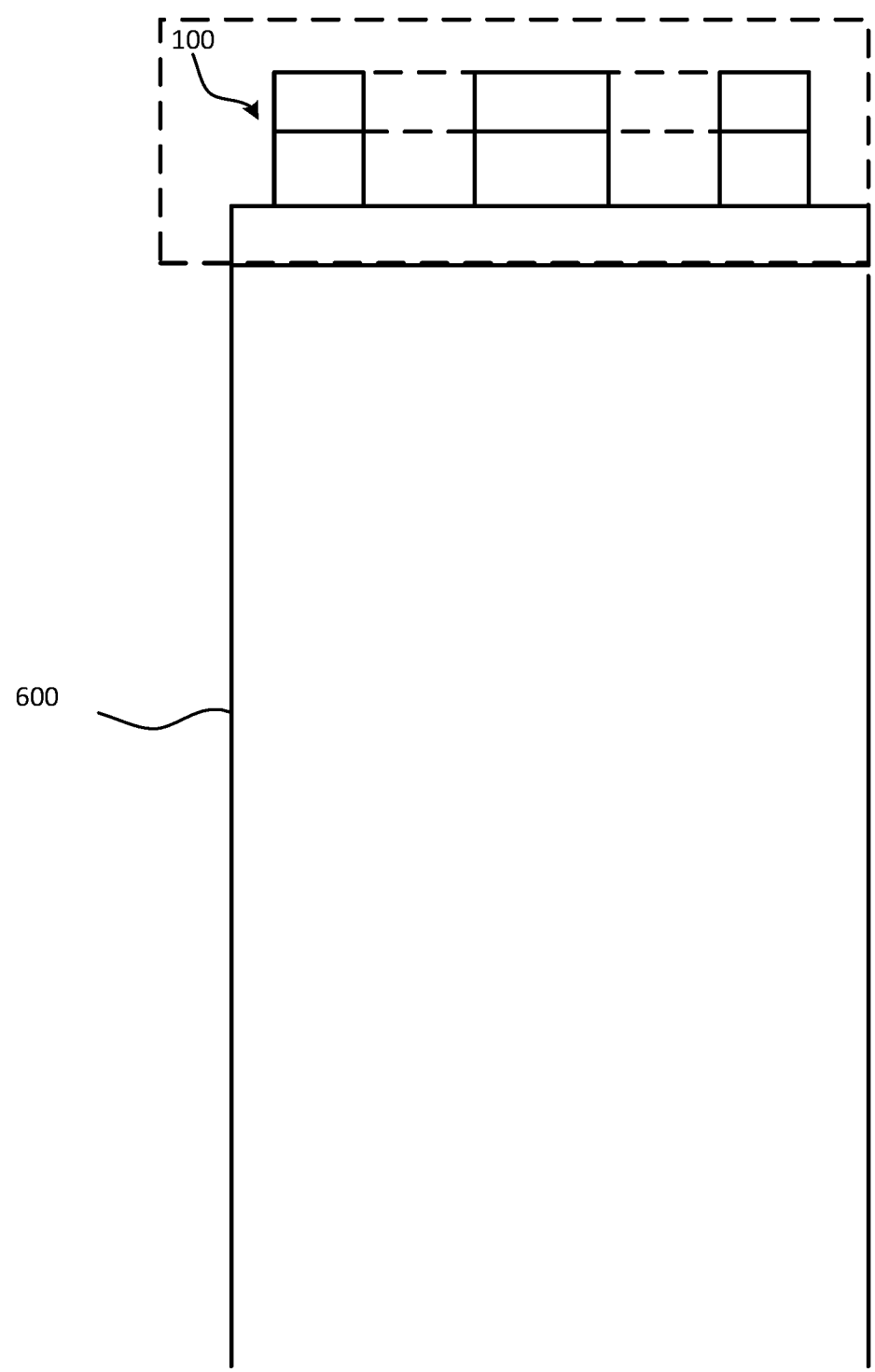
FIG. 14 is a block diagram of an example of a probe including the optical sensor.

The bleeding sensor described here has a number of different applications, such as a pill shaped capsule 500 (FIG. 13) or a probe 600 (FIG. 14). In FIGS. 13 and 14, the bleeding sensor 100 is shown, but it should be understood that any configuration of the bleeding sensor described herein may be used. The bleeding sensor may be powered either through a battery/capacitor/power source within the capsule, or wirelessly through magnetic induction, RF power transmission, or ultrasound power delivery. The pill shaped capsule 500 or the probe 600 can contain circuits and antenna components to transmit measurements wirelessly outside of the body. A physician/surgeon may place the pill shaped capsule 500 or the probe 600 can inside the GI tract during a bowel resection. The pill shaped capsule 500 or the probe 600 can may be used in the esophagus, stomach, small intestine, or colon The pill shaped capsule 500 or the probe 600 is especially suited for use in the colon because it can use multiple wavelengths of light to filter out false signals from fecal matter. In the pill shaped capsule 500, for example, the physician can leave the pill device in the GI tract after completing the surgery and then receive data from the bleeding sensor wirelessly. The bleeding sensor data may be used to determine whether a hemorrhage has occurred, and may give a doctor early warning, allowing the doctor to intervene before the situation becomes critical for the patient. The bleeding sensor can also tell the doctor the ratio between fresh and occult blood based on ratios of the multiple wavelengths of light received at the photodiode, allowing a determination of the location of the hemorrhage (e.g., upper GI hemorrhage vs lower GI hemorrhage). In some embodiments, software and algorithms can be provided to receive data from the bleeding sensor and provide alerts to the physician if a hemorrhage is detected. Once the patient has recovered, the pill-shaped capsule may naturally pass out of the body through defecation. In some embodiments, the pill-shaped capsule may be fixed to the wall of the GI tract with dissolvable sutures, dissolvable adhesives, hemoclips, suction, or another method to keep the bleeding sensor in place for a predetermined amount of time before it passes out of the body.

As shown in FIG. 13, the bleeding sensor (as shown, sensor 100, but may be other sensors) can be packaged into a pill-shape capsule that is swallowed by a patient. This may be prescribed when a patient is about to undergo a surgery that leaves them at risk for hemorrhage, or if a patient has a suspected hemorrhage or GI bleed. The pill can wirelessly transmit measurements back to the physician to enable determination of the presence and properties of blood in the GI tract. In some embodiments, software/algorithms may be provided that generate an alert when a certain level of blood is detected. In some embodiments, the location of the pill inside the GI tract can be measured by the bleeding sensor based on measurements at multiple wavelengths. The pill-shaped capsule can include electrodes and/or other therapeutic modalities (represented as element 508) as well as diagnostic modalities (e.g., sensors); by way of example, sensors that can receive a small amount of fluid through a hole 516 in the pill are illustrated on the other end. The wireless communication hardware is within the pill and not illustrated.

The bleeding sensor can be packaged into a pill-shaped capsule and paired with hardware and software for remote diagnostic use. In this embodiment, the pill-shaped capsule may contain additional sensors and/or therapeutic components. The pill-shaped capsule containing the bleeding sensor, along with hardware for remote use outside a hospital or clinic, can be delivered to the patient, this may be accomplished through mail/package shipment, or the patient may receive the pill-shaped capsule at a pharmacy, retail store, or clinic. The patient swallows the pill-shaped capsule, ideally in their own home and according to instructions by a physician or professional, and the pill-shaped capsule proceeds to record measurements from the bleeding sensor as it travels through the GI tract. These measurements are wirelessly transferred to hardware/software outside the body; this may be a dedicated receiver module or a mobile device, such as a phone, computer, or tablet device. The hardware/software uploads the data to a remote database where a physician or professional may review the data, provide diagnostic services, and/or recommend a therapy. In some embodiments, remote diagnostics and location of blood in the GI tract can be performed automatically through one or more algorithms. In some embodiments, an alert may be issued to the patient and/or to a physician if the blood concentration is above a certain level or another feature measured by the sensor meets a predetermined threshold. This application is especially useful for remote diagnostics, and would allow patients with suspected GI bleeding or risk factors for GI bleeding to remotely consult with a physician via telemedicine, receive a sensor pill-shaped capsule in the mail, activate and use said sensor pill-shaped capsule, and receive real-time diagnostics without having to go to a hospital or clinic or receive invasive endoscopic examinations.

As shown in FIG. 14, the bleeding sensor (as shown, sensor 100, but may be other sensors) may be placed at the end of a probe that is inserted into the GI tract. The probe may be inserted through the esophagus, through the rectum/colon, or through an incision into the GI tract. In this embodiment, the bleeding sensor may be used to measure the presence and properties (fresh vs occult) in a patient with suspected hemorrhage. In this embodiment, the use of multiple wavelengths provides a clear advantage over existing technology as it allows the detection of blood in the presence of fecal matter, allowing patients to undergo endoscopic or colonoscopic diagnosis immediately without requiring bowel cleaning or a fasting period.

It should be understood that the bleeding sensor may be combined with other sensors or therapeutic modalities. The combinations and applications listed below are given as examples, and are not exhaustive. The bleeding sensor when packaged in a pill capsule form factor could be combined with sensors to allow the device to determine a location of the bleeding sensor in the GI tract more accurately. These sensors may include, but are not limited to, pH sensors, temperature sensors, pressure sensors, impedance sensors, and inertial measurement units (IMUs). The bleeding sensor may also be used to monitor for sepsis or anastomotic leakage through the measurement of tissue oxygen saturation (StO2), alone or in combination with sensors for pH, temperature, and impedance. The bleeding sensor may be used for monitoring of post-operative ileus by detecting mucosal wall movement; this may be done alone or in combination with sensors for pressure, movement (IMU), and impedance. Furthermore, the bleeding sensor may be combined with therapeutic modalities. The bleeding sensor may be combined into a pill capsule with a drug release chamber, where the detection of blood may be used to trigger the release of a certain drug. This may be done manually, through wireless communication with a physician or user who can visualize measurements and trigger the drug release wirelessly, or it may be done automatically using a feedback algorithm or system. In some embodiments, the amount or rate of drug release may depend on the amount and property of the detected blood. The bleeding sensor may be combined with electrodes and circuits for electrical neurostimulation in a capsule form factor. In some cases, the neurostimulation may be triggered to begin or have its properties (wavelength, frequency, amplitude, etc.) altered based on measurements from the bleeding sensor. In other cases, the detection of a certain level of blood or certain properties of blood may trigger the neuromodulation to stop or start, potentially until the blood level is below a predetermined threshold.

The bleeding sensor may be combined with phototherapy/photobiomodulation in a single device. In some embodiments, the same LEDs or light emitters used for the bleeding sensor will be used for phototherapy; the power level to the LEDs may be varied dynamically so that, for example, lower light intensities are used for measurement and higher light intensities are used for therapy. In other embodiments, separate LEDs, laser diodes, or other light emitters are used for photobiomodulation/phototherapy. In some cases, the presence of blood as measured by the bleeding sensor could trigger the initiation of phototherapy. This is especially relevant if the phototherapy is designed to address the cause of bleeding, for example in a GI ulcer. The use of multiple LEDs with different wavelengths could prove useful in this case by enabling the differentiation of occult and fresh blood, helping to localize the source of the bleeding.

IV. Methods

Figure 15:
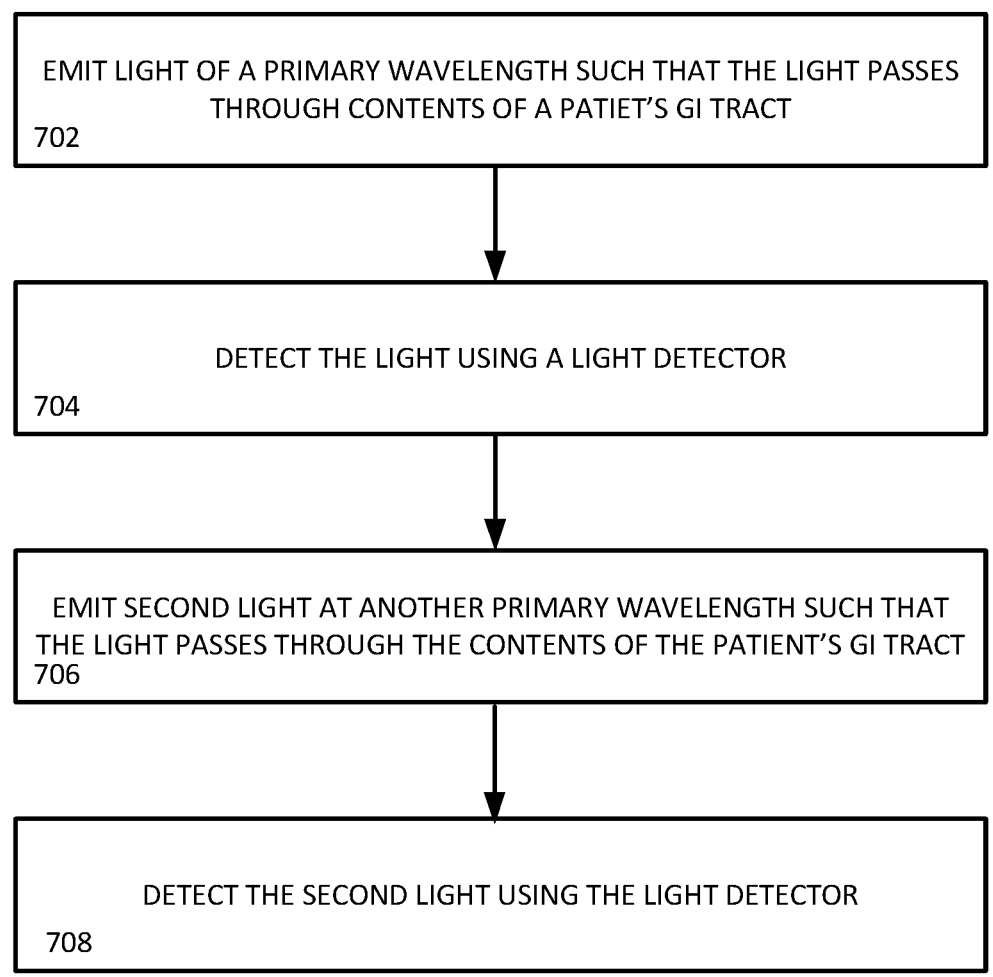
FIG. 15 is a process flow diagram illustrating a method for detecting blood in contents of a patient's GI tract.

Another aspect of the present disclosure can include methods 700 and 800 (shown in FIGS. 15 and 16) that can employ a bleeding sensor that uses an optical mechanism to detect blood in the patient's GI tract. As an example, the bleeding sensor can be any one of the optical sensors shown in FIGS. 1-7 and/or 13-14. For purposes of simplicity, the methods 700 and 800 are shown and described as being executed serially. However, it is to be understood and appreciated that the present disclosure is not limited by the illustrated order as some steps could occur in different orders and/or concurrently with other steps shown and described herein. Moreover, not all illustrated aspects may be required to implement the methods 700 and 800, nor are methods 700 and 800 limited to the illustrated aspects Referring now to FIG. 15, illustrated is a method 700 for detecting blood in contents of a patient's GI tract. An optical sensor (e.g, the bleeding sensor shown in FIGS. 1-7 and/or 13-14) can be placed inside a GI tract of a patient. For example, the optical sensor can include at least: a centrally-located light detector with a broad sensitivity spectrum on a substrate; at least two light emitters (e.g., LEDs), each configured to emit light of different primary wavelengths, each located radially around the centrally-located light detector (e.g., a photodiode) on the substrate; a gap between the at least two light emitters and the centrally-located light detector configured to accept contents of a patient's gastrointestinal tract; and an optical cap configured to direct light emitted by the at least two light emitters through the gap and onto the centrally-located light detector. As an example, the optical sensor can be encapsulated within a pill-shaped capsule configured to transmit data to and receive data from hardware at a location outside the patient's body.

At 702, light can be emitted (e.g., from one of the at least two light emitters of the sensor) of a primary wavelength such that the light passes through contents of the patient's GI tract (e.g., the contents can be fecal matter in the gap). At 704, the light can be detected (e.g., after traversing the contents of the patient's GI tract) using a light detector (e.g., the centrally-located light detector). At 706, a second light can be emitted (e.g., from another one of the at least two emitters of the sensor) of a second (different) primary wavelength such that the light passes through contents of the patient's GI tract to the light detector. At 708, the light can be detected (e.g., after traversing the contents of the patient's GI tract) using a light detector (e.g., the centrally-located light detector).

Figure 16:
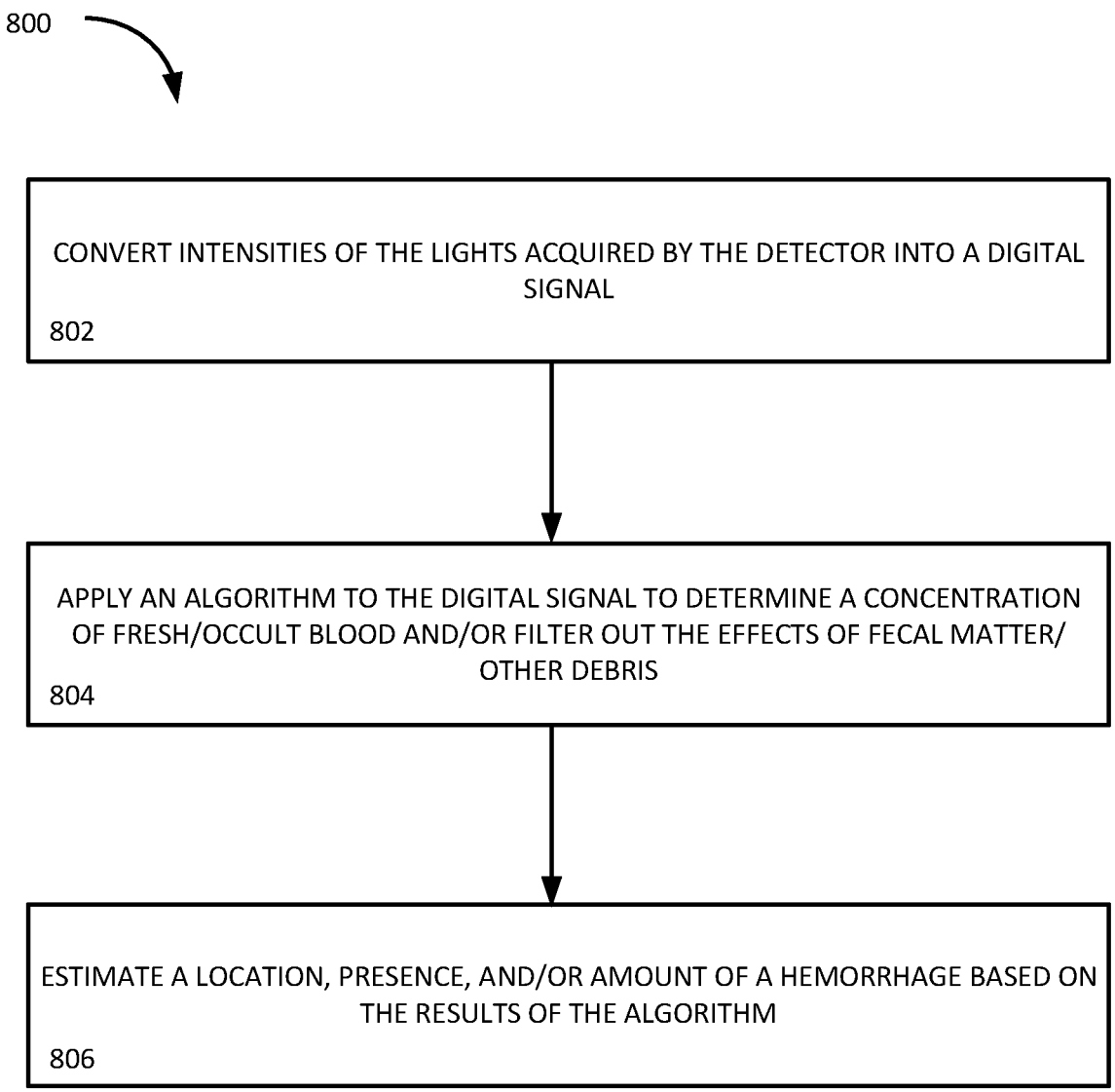
FIG. 16 is a process flow diagram illustrating a method for estimating a location, presence, and/or amount of a GI hemorrhage.

The light detector (e.g., the centrally-located light detector) can detect blood in the contents of the patient's GI tract based on the light signals the light detector detects after the light emitted by the at least two light emitters has passed through contents of the patient's GI tract in the gap. FIG. 16 shows an example method 800 for estimating a location, presence, and/or amount of a GI hemorrhage. In this example, the optical cap can be positioned on top of the centrally-located light detector, the gap, and the at least two light emitters. In some instances, the optical sensor can be encapsulated within a pill-shaped capsule configured to transmit data to and receive data from hardware (e.g., a smartphone, a tablet, a computer, or any device that includes a processor) at a location outside the patient's body. The data can be related to the light signals detected by the centrally-located light detector after passing through contents of the patient's gastrointestinal tract in the gap. The pill-shaped capsule may be inserted into the GI tract of the patient during surgery, swallowed by the patient, or the like.

At 802, intensities of the lights acquired by the detector can be converted into a digital signal. At 804, an algorithm can be applied (e.g., by hardware with a processor, such as hardware at a location outside of the patient's body) to the digital signal to determine a concentration of fresh/occult blood and/or filter out the effects of fecal matter and/or other debris. For example, the algorithm can be used to determine a relative concentration of fresh blood and a relative concentration of occult blood and to estimate a location of a hemorrhage based on the relative concentration of fresh blood and the relative concentration of occult blood. At 806, a location, presence, and/or amount of hemorrhage can be estimated based on the results of the algorithm. When GI blood is detected in the contents of the GI tract, an alert can be transmitted to the patient and/or a physician if the concentration of blood in the contents meets or exceeds a predetermined threshold.

In some instances, at least a portion of the data can be displayed to a diagnostic authority who can suggest a potential diagnosis based on at least the portion of the data. As an example, the diagnostic authority can be one or more medical professions located local or remote to the patient. As another example, the diagnostic authority can be a computing device located local or remote to the patient. As yet another example, the diagnostic authority can include one or more medical professionals and a computing device.

From the above description, those skilled in the art will perceive improvements, changes, and modifications. Such improvements, changes, and modifications are within the skill of one in the art and are intended to be covered by the appended claims.

What is claimed is:

1. A sensor comprising:
   a planar substrate having a top face;

at least three light emitters on the top face of the planar substrate and each configured to emit light of different primary wavelengths;
a centrally-located light detector with a broad sensitivity spectrum on the top face of the planar substrate with the at least three light emitters, wherein the centrally-located light detector is centrally-located with respect to the at least three light emitters, wherein each of the at least three light emitters is located radially around the centrally-located light detector and at least two of the at least three light emitters are positioned on opposite sides of the centrally-located light detector;
a wide angle lens position over the centrally-located light detector;
a gap between each of the at least three light emitters and the centrally-located light detector and configured to accept contents of a patient's gastrointestinal tract; and
at least three mirrors, each positioned above one of the at least three light emitters and configured to reflect the light of the different primary wavelength emitted by the one of the at least three light emitters and direct the reflected light through the contents of the patient's gastrointestinal tract in the gap and into the wide angle lens,
wherein the wide angle lens focuses the reflected light that travelled through the contents of the patient's gastrointestinal tract in the gap from each of the at least three mirrors onto the centrally-located light detector,
wherein the centrally-located light detector is configured to detect light signal from the at least three light emitters that have passed through the contents of the patient's gastrointestinal tract in the gap and to detect blood within the contents of the patient's gastrointestinal tract in the gap based on intensities of the light signals detected.

2. The sensor of claim 1, wherein the centrally-located light detector is a photodiode and the at least three light emitters are at least three light emitting diodes.

3. The sensor of claim 1, wherein the blood is fresh blood and/or occult blood and the difference between fresh blood and occult blood is detectable by the centrally-located light detector.

4. The sensor of claim 1, further comprising a circuit connected to the at least three light emitters and configured to regulate a power delivered to each of the at least three light emitters and/or control a timing parameter of the light of the different primary wavelength emitted by each of the at least three light emitters.

5. The sensor of claim 1, further comprising an amplifier circuit connected to the centrally-located light detector and configured to convert at least one of the reflected light that travelled through the contents of the patient's gastrointestinal tract in the gap detected by the centrally-located light detector into a digital signal.

6. The sensor of claim 1, further comprising a pill-shaped capsule configured to encapsulate the centrally-located light detector surrounded by the at least three light emitters, the wide angle lens, and the at least three mirrors, wherein the gap is less than entirely encapsulated.

7. The sensor of claim 6, wherein the pill-shaped capsule is configured to transmit data to and receive data from a hardware device at a location outside the patient's body.

8. The sensor of claim 6, wherein the pill-shaped capsule further comprises a pH sensor, an impedance sensor, a temperature sensor, a pressure sensor, and/or a movement sensor.

9. The sensor of claim 6, wherein the pill-shaped capsule further comprises:
one or more elements configured to provide electrical neurostimulation, phototherapy, and/or photobiomodulation and configured to be adjusted when a predetermined concentration of blood is detected; and/or
a drug reservoir and electrochemical circuitry configured to control release of a drug in the drug reservoir when the predetermined concentration of blood is detected.

10. The sensor of claim 1, further comprising a probe configured to house the sensor and configured to be inserted into the patient's gastrointestinal tract via insertion through the esophagus, insertion through the colon or rectum, and/or insertion through an incision in the patient's gastrointestinal tract.

11. The system of claim 1, further comprising at least four light emitters on the face of the substrate located radially around the centrally-located light detector.

12. A method comprising:
placing a sensor inside a gastrointestinal tract of a patient, the sensor comprising:
a planar substrate having a top face;
at least three light emitters on the top face of the planar substrate;
a centrally-located light detector with a broad sensitivity spectrum on the top face of the planar substrate with the at least three light emitters, wherein the centrally-located light detector is centrally-located with respect to the at least three light emitters,
wherein each of the at least three light emitters is located radially around the centrally-located light detector, and at least two of the at least three light emitters are positioned on opposite side of the centrally-located light detector;
a wide angle lens positioned over the centrally-located light detector;
a gap between the at least three light emitters and the centrally-located light detector configured to accept contents of a patient's gastrointestinal tract; and
at least three mirrors, each positioned above one of the at least three light emitters and configured to reflect light of the different primary wavelength emitted by one of the at least three light emitters and direct the reflected light through the contents of the patient's gastrointestinal tract in the gap and into the wide angle lens;
emitting, by each of the at least three light emitters, the light of the different primary wavelength towards a respective one of the at least three mirrors,
reflecting, by each of the at least three mirrors, light emitted by a respective one of the at least three light emitters through the contents of the patient's gastrointestinal tract in the gap to the wide angle lens;
focusing, by the wide angle lens, reflected light that travelled through the contents of the patient's gastrointestinal tract in the gap into the centrally-located light detector; and
detecting, by the centrally-located light detector, the reflected light that travelled through the contents of the patient's gastrointestinal tract in the gap,
wherein blood is detectable in the contents of the patient's gastrointestinal tract based on intensities of the reflected light that travelled through the contents of the patient's gastrointestinal tract in the gap.

13. The method of claim 12, wherein the sensor is encapsulated within a pill-shaped capsule configured to transmit data to and receive data from hardware at a location outside the patient's body, wherein the data is related to the reflected light that travelled through the contents of the patient's gastrointestinal tract in the gap and is detected by the centrally-located light detector.

14. The method of claim 13, wherein an algorithm is applied to the data by the hardware at the location outside the patient's body to determine a concentration of blood in the contents of the patient's gastrointestinal tract and to filter out effects of fecal matter and other debris found in the patient's gastrointestinal tract on the reflected light that travelled through the contents of the patient's gastrointestinal tract in the gap.

15. The method of claim 14, wherein the algorithm is used to determine a relative concentration of fresh blood and a relative concentration of occult blood and to estimate a location of a hemorrhage based on the relative concentration of fresh blood and the relative concentration of occult blood.

16. The method of claim 13, wherein the hardware comprises a smartphone, a tablet, or a computer.

17. The method of claim 13, wherein the capsule is inserted into the gastrointestinal tract of the patient during surgery or swallowed by the patient.

18. The method of claim 13, further comprising transmitting the data to a patient, a physician, or a computer system at a remote location different from that of the device.

19. The method of claim 18, wherein the data comprises an alert to be displayed to the patient and/or the physician if the concentration of blood in the contents of the gastrointestinal tract meets or exceeds a predetermined threshold.

20. The method of claim 18, further comprising receiving a signal from the remote location in response to the transmitted data and starting, stopping, or modifying a therapy based on the information encoded in the received signal.

* * * * *